United States Patent [19]

Thomas

[11] Patent Number: 5,239,169
[45] Date of Patent: Aug. 24, 1993

[54] OPTICAL SIGNAL PROCESSOR FOR BARCODE READER

[75] Inventor: James E. Thomas, Issaquah, Wash.

[73] Assignee: Microscan Systems Incorporated, Tukwila, Wash.

[21] Appl. No.: 702,421

[22] Filed: May 20, 1991

[51] Int. Cl.⁵ .............................................. G06K 7/10
[52] U.S. Cl. .................................. 235/462; 250/216
[58] Field of Search ................ 250/216; 235/462, 467; 359/718, 720, 725

[56] References Cited

U.S. PATENT DOCUMENTS

| | | |
|---|---|---|
| 2,018,963 | 10/1935 | Land . |
| 3,502,888 | 3/1970 | Stites .................................... 250/566 |
| 3,604,802 | 9/1971 | Ohmori et al. ...................... 250/216 |
| 3,746,868 | 7/1973 | Plockl ................................. 250/566 |
| 3,801,182 | 4/1974 | Jones ................................... 250/225 |
| 3,812,374 | 5/1974 | Tuhro ................................. 250/568 |
| 4,323,925 | 4/1982 | Abell et al. ......................... 250/216 |
| 4,820,911 | 4/1989 | Arackellian et al. ............... 235/467 |
| 4,962,311 | 10/1990 | Poisel et al. ......................... 250/216 |
| 5,017,765 | 5/1991 | Shepard et al. ..................... 235/462 |

*Primary Examiner*—John Shepperd
*Attorney, Agent, or Firm*—Graybeal Jackson Haley & Johnson

[57] ABSTRACT

A bar code reader having a scanned light and a stationary photodetector is disclosed. The photo detector uses a lens having a pyramidal frusta-like body to concentrate light. The input side has a pair of oppositely angles side planes facing opposite extremities of a scanned label. The faces can be used to mount filters to reject ambient light, and a polarizer can be used to reject specular reflection from the scanning laser.

20 Claims, 3 Drawing Sheets

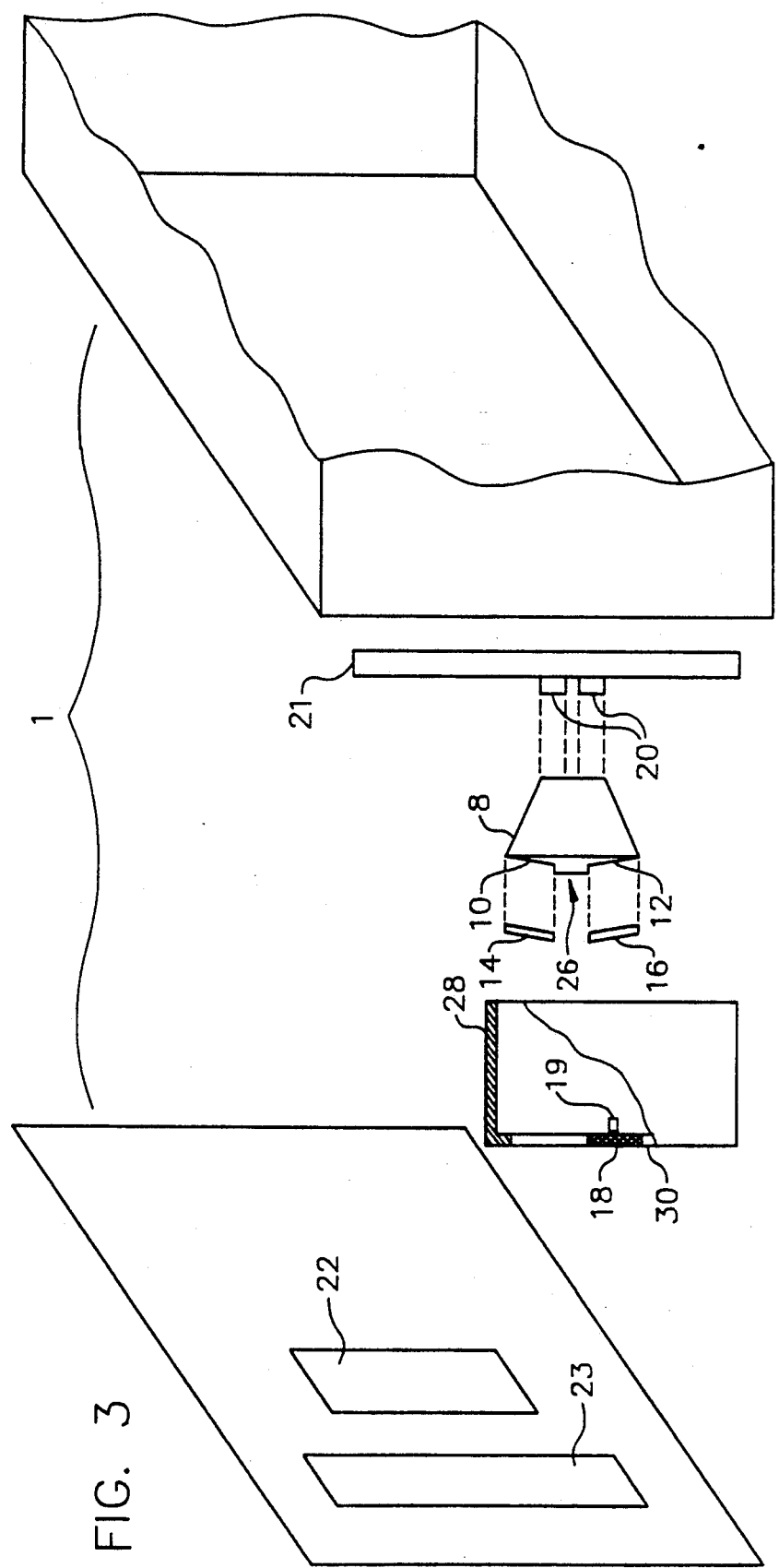

OPTICAL SIGNAL PROCESSOR FOR BARCODE READER

BACKGROUND OF THE INVENTION

The present invention relates to optical barcode readers and includes an optical signal processing detector that results in a cleaner, more linear electrical signal at the photodiode level.

Barcode reading systems, as known in the art, employ a finely focused light beam scanned across a coded label located in the field of view of a photodetector. The label represents information encoded as a series of bars of various widths formed on a contrasting background. The difference in reflectance of the bars versus the spaces produces a modulated optical signal. The optical signal is converted to an electrical signal by a photodetector. This electrical signal is further processed and digitized before decoding.

As barcode scanner technology has advanced, the quality of label necessary for accurate reading has decreased. This is highly advantageous in that labels can now be printed by conventional printing methods directly on packaging. Alternatively, computer printed labels can be employed to further automation.

Regardless of the system design, all barcode reading systems must address several common, inherent problems:

A major concern lies in the nature of the light reflected from barcode labels. Most of the light returned to the detector is diffuse, due to the optically rough surface of the label. It is the difference in this diffuse light to which the detector is sensitized. When labels are printed on smooth, shiny surfaces or are oriented in a particular way, mirror-like reflections can be returned to the detector. These intense specular reflections can overpower the diffuse light signal and introduce a major source of error.

A second problem is ambient light. Strong interior lighting or bright sunlight can also overpower the detector and further decrease the signal to noise ratio.

A further design consideration is the ideal that the detector receive the same intensity of diffuse light from all points along the scan width. This is a difficult objective to achieve because considerably more light is returned from the central area of the scan than from the periphery.

Shotnoise is an additional consideration. Technically, shotnoise is characterized by fluctuations in the current leaving the photodiode. Shotnoise increases with increased photodiode area. Furthermore, when the received light signal is less concentrated over a large photodiode area the signal to noise ratio also decreases.

In order to realize the benefits of inexpensive labels and to compensate for these adverse optical signal conditions, barcode reader designers have evolve increasingly expensive and complicated electronic signal conditioning techniques. This invention shows that these shortcomings can be addressed more economically by optical means, resulting in a more accurate electrical signal at the outset.

Some of the problems discussed above have been addressed, to a limited extent, in the prior art.

U.S. Pat. No. 2,018,963, Land, disclosed the use of a polarization technique to attenuate specular reflections. The method involves polarizing the light source normal to the plane of incidence and viewing the image with an analyzer crossed with the polarizer. U.S. Pat. Nos. 3,812,374, Tuhro, 3,801,182, Jones, and 3,502,888, Stites, employ this technique in various forms. All are based on the fact that specular reflections maintain the same polarization as the incident beam whereas the diffuse light is randomly polarized and will not be absorbed by an analyzer crossed with the incident polarizer. The present invention forgoes the need for an initial polarizer because the diode laser output is inherently polarized.

U.S. Pat. No. 3,746,868, Plockl, disclosed the use of narrow-pass wavelength filters as a means to improve the signal to noise ratio in an optical reader by filtering out light of a different wavelength than the optical reader light source, e.g. ambient light. This effective, inexpensive technique is further improved in the present invention.

In light of these considerations, it is an object of the present invention to provide an optical barcode reader operable in a wide range of ambient light conditions.

It is a second object of the invention to provide an optical barcode reader desensitized to specular reflections.

It is a further object of the invention to provide an optical detector assembly for a barcode scanner that gathers a uniform intensity of diffuse light throughout the scan angle.

It is an additional object of the invention to provide an optical detector assembly for a barcode reader that minimizes shotnoise produced by the photodiodes.

It is yet another object of the invention to provide an effective optical solution to the inherent adverse optical signal conditions encountered by barcode readers, thereby eliminating the need for expensive and complicated electronic signal conditioning techniques.

Other objects and advantages of this invention will become apparent when the following detailed description is taken in conjunction with the drawings and appended claims.

SUMMARY OF THE INVENTION

The present invention achieves these objectives by providing a systematic treatment of the returned light signal that results in a photodiode electrical current of high signal to noise ratio and consistent amplitude over the scan width. This optical signal conditioning takes the form of an improved detector assembly utilizing several cooperating optical elements.

The invention employs an optically transparent lens of high index of refraction that is generally prismatic and more specifically, as shown in the drawings, is of pyramidal frusta-like shape to conduct light reflected from the label to a pair of conventional photodiodes. This lens, which can be economically formed of cast plastic, condenses the signal in area. This allows the photodiode area to be minimized. As indicated previously, shotnoise is a function of total photodiode area, so shotnoise will thereby be decreased.

The invention also optically improves the signal by other means such as a cross-polarization system to remove specular reflections and bandpass filters to remove the ambient light reflected. In addition, the filters and the input side of the lens are angled to the sides of the label, rather than the center, to ensure that light is received over the entire scan width. To compensate for the increased light intensity received from the center of the label, a strip of opaque material is used to prevent light from entering the center of the lens.

These simple, yet significant cooperating elements compose a photodetector that is cost effective to produce and alleviates the need for expensive electrical signal conditioning components.

BRIEF DESCRIPTION OF THE DRAWINGS

FIG. 3 is an exploded detail view of the detector assembly shown from below the optical detector system as in FIG. 2.

DETAILED DESCRIPTION

Figure 1:
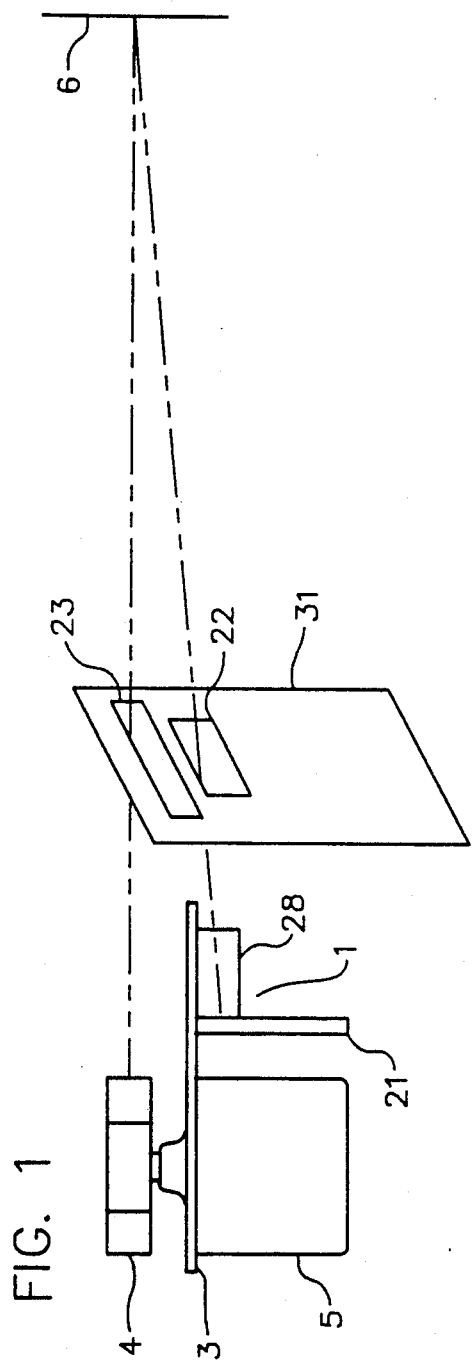
FIG. 1 is a pictorial side view of the system of directing light to an encoded label and of the optical detector system for processing the reflected light received.

FIG. 1 shows light being deflected by scanning mirror 4, rotated by motor 5, through laser window 23 of barcode reader housing 31 to encoded label 6. The light is then reflected through polarizer 22 to optical detector 1.

Figure 2:
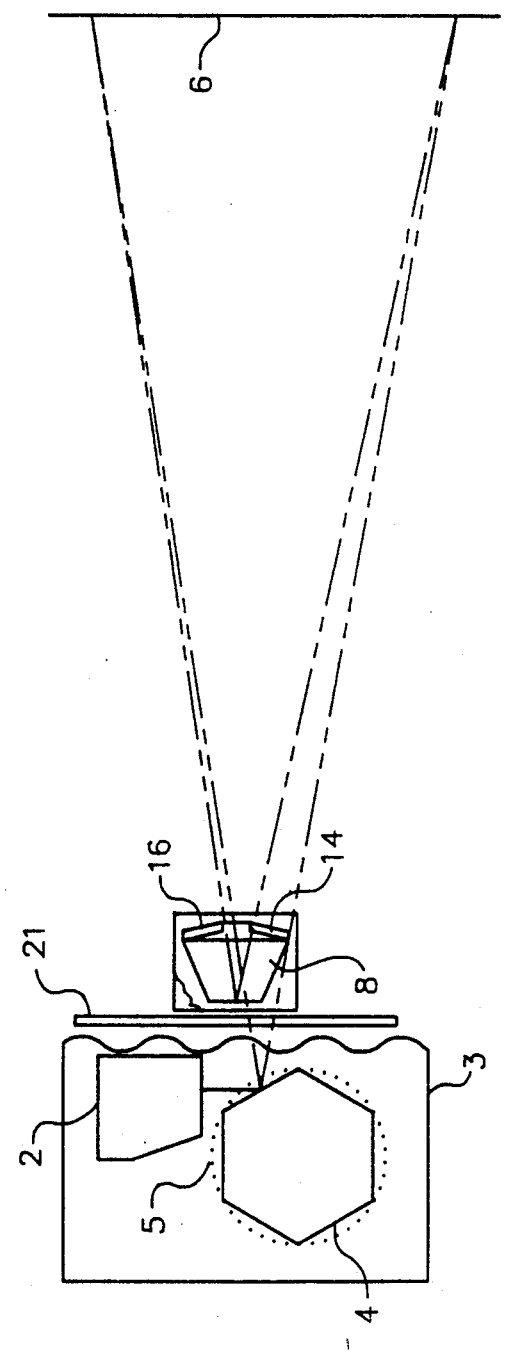
FIG. 2 is a pictorial view from below FIG. 1 of the same system for directing light to an encoded label with a more detailed view of the optical detector system.

FIG. 2 shows light from laser 2 being deflected by scanning mirror 4 on to encoded label 6. Laser 2 produces a monochromatic light beam that is either inherently polarized as in FIG. 2 or polarized by a polarizing element added anywhere between laser 2 and label 6. Scanning mirror 4 is multifaceted and is rotated so that the light beam scans the entire width of the label. Light reflected from label 6 passes through lens 8 where it is condensed in area and thus, concentrated when it leaves the output side of lens 8 to be detected by a photodetector means, which preferably is a dual photodiode system 20.

Referring now to FIG. 3, before the reflected light reaches lens 8, it passes through plane polarizer 22 that is a window of reader housing 31. Polarizer 22 is oriented orthogonal to the light directed to label 6 to filter out specular reflections, which are of the same polarity as the light directed to the label. This allows the detector to receive a predominantly diffuse light signal from the white background between the black bars of label 6. Specular reflections from the black bars ar attenuated by the cross (orthogonal) polarization so as not to overpower the diffuse light read from the white spaces between bars. Most of this diffuse signal next passes through bandpass filters 14 and 16 that absorb wavelengths outside a narrow band centered around the laser wavelength, thereby eliminating reflected ambient light. Filters 14 and 16 are angled towards the left and right side of the label 6 respectively to allow them to receive light from the entire scan width.

The filters used in the preferred embodiment each have an angle rating of approximately 20 to 25 degrees for a total of 40 to 50 degrees. The scan angle is approximately 60 to 70 degrees. Thus, the filter angle needs to be approximately 10 to 15 degrees for a total of 20 to 30 degrees. The total of the filter angle rating plus the filter angle equal the scan angle. The filter angle should be altered accordingly if the angle rating or the scan angle is altered.

In addition, the filters are spaced apart with the space being covered by a strip of opaque material 18. This opaque material 18 further attenuates the signal reflected from the central region of the label 6 ensuring that a more uniform intensity of light is gathered across the scan width. This filter angle/opaque material scheme counters the undesirable characteristic that more light is returned from the center of the scan than from the ends due to the inverse square law and the geometry of the scan.

The light passing through the filters is received by the light input side of lens 8. Lens 8 can be formed of any optically transparent material, including plastics such as TYRIL SAN copolymer produced by Dow Chemical U.S.A. This allows the barcode reader to be made for a fraction of the cost of the expensive electrical signal conditioning components as employed in the prior art.

Figure 5:
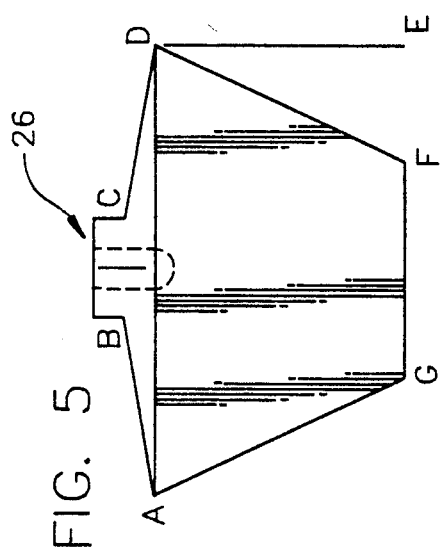
FIG. 5 is a bottom view from below of the lens used in the optical detector system.
Figure 7:
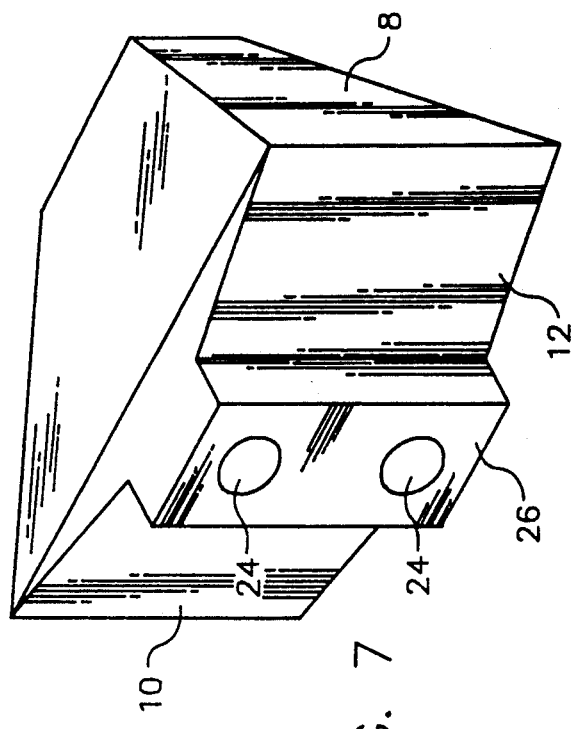
FIG. 7 is an isometric view of the lens shown in FIGS. 4, 5, and 6.
Figure 4:
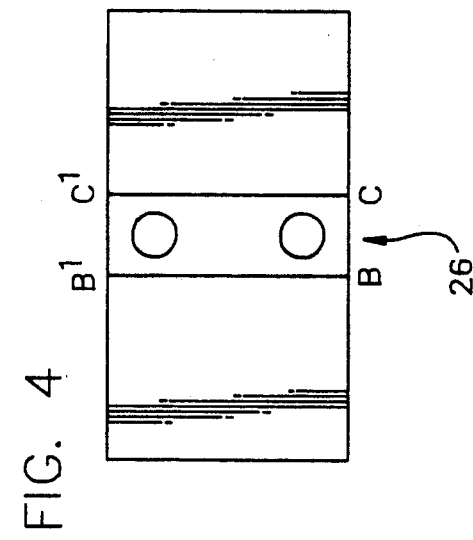
FIG. 4 is a front view of the input side of the lens used in the optical detector system.
Figure 6:
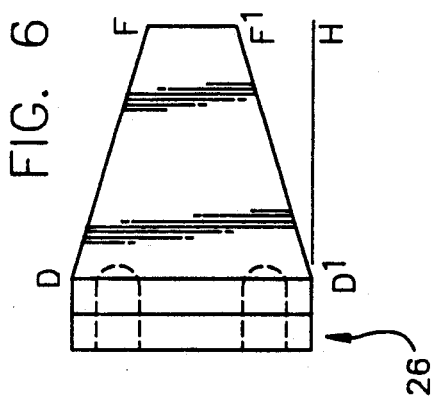
FIG. 6 is a side view of the lens used in the optical detector system.

FIGS. 4-6 give a more detailed representation of the shape of the lens used in the preferred embodiment. FIG. 4 shows that the width of the input side, represented by line AD, is larger than the width of the output side. The preferred range of narrowing, defined by angle EDF is from 15 to 25 degrees. FIG. 5 is a right side view showing the equally important narrowing of the length of the input side(the dimension going into the page in FIG. 2) to the length of the output side. The preferred range of narrowing in this dimension, defined by angle HDF is from 15 to 25 degrees. This diminishment of cross sectional area is what allows lens 8 to concentrate the signal leaving its output side.

FIGS. 4 and 5 also show rectangular protuberance 26, which is used to attach lens 8 to lens subhousing 28. Protuberance 26 also serves as a spacer separating recessed input side planes (or faces) 10 and 12 that receive filters 14 and 16 affixed between the lens subhousing 28 and lens planes 10 and 12 respectively. Protuberance 26 is, formed with pin holes 24, which receive lens mounting pins 19 (ref. FIG. 3) projecting from lens subhousing 28 for locating and holding lens 8 in place. The lens mounting pins 19 and adjacent area of the subhousing 28 also serve as opaque material 18 which blocks reflected light from entering the central area of the lens 8 as described above.

This concentrated light signal passes to the photodetection means, preferably a pair of photodiodes 20, mounted on detector wall 21, such as provided by a printed circuit board. Photodiodes 20 transform the light signal into an electrical signal. The pair of photodiodes 20 are connected in parallel to produce an electrical signal representative o the entire light signal received. As indicated above, the signal concentration performed by the lens 8 allows the size of the photodiodes to be minimized, thereby reducing shotnoise. Conventional circuitry (not shown), mounted on base 3 and detector wall 21, processes, digitizes, and decodes the electrical signal without resorting to any special circuitry that would be needed had the novel optical processing described above not been employed.

Preferably, the input side of lens 8 consists of planes 10 and 12 angled as discussed above for seating the filters 14 and 16 so that the plane angle is approximately 10 to 15 degrees. Filters 14 and 16 ma be directly affixed to planes 10 and 12 respectively to ensure that the plane angle equals the filter angle. These planes are angled for the same reason that the filters were angled: to ensure that as much light as possible is received from the outboard ends of the label 6.

While only particular embodiments have been disclosed herein, it will be readily apparent to persons skilled in the art that numerous changes and modifications can be made thereto including the use of equivalent means and devices without departing from the spirit of the invention.

We claim:
1. An optical barcode reader comprising:
   a. means for directing light to the an encoded label;
   b. cross-polarization means for filtering light reflected from the label that is of the same polarity as the light directed to the labels;
   c. photodetection means for producing an electrical signal in response to light reflected from the label;
   d. signal decoding means of interpreting the signal produced by the photodetection means; and
   e. a lens having a pyramidal frusta-like body tapering at a rate of 15–25 degrees from a base end that serves as an optical input for incoming signal light reflected from a label, and having its truncated end as an output for directing concentrated light onto said photodetection means, said base end at said input formed with a pair of oppositely angled side planes that merge at the center of the base with a rectangular protuberance that separates said side planes, said lens being oriented so that said side planes of said lens are facing opposite extremities of a scanned label.

2. The optical barcode reader of claim 1 wherein the photodetection means comprises dual photodiodes.

3. The optical barcode reader of claim 1 wherein the means for directing light to the label comprises an inherently polarized laser.

4. The optical barcode reader of claim 1 further comprising a means for preventing light from entering a central area of the light input side of the lens.

5. The optical barcode reader of claim 1 wherein the lens is formed from optically transparent plastic.

6. The optical barcode reader of claim 1 wherein the cross sectional area of the input side is more than twice that of the output side.

7. The optical barcode reader of claim 1 wherein each of said side planes is angled at a plane angle of 10 to 15 degrees.

8. An optical barcode reader comprising:
   a. an inherently polarized laser;
   b. scanning mirror means for directing the laser light to an encoded label;
   c. a cross-polarizer for filtering light reflected from the label that is of the same polarity as the laser light;
   d. photodetection means for producing an electrical signal in response to light reflected for the label;
   e. signal decoding means for interpreting the signal produced by the photodetection means; and
   f. a lens having a pyramidal frusta-like body tapering at a rate of 15–25 degrees from a base end that serves as an optical input for incoming signal light reflected from a label, and having its truncated end as an output for directing concentrated light onto said photodetection means, said base end at said input formed with a pair of oppositely angled side planes that merge at the center of the base with a rectangular protuberance that separates said side planes, said lens being oriented so that said side planes of said lens are facing opposite extremities of a scanned label.
   g. a first bandpass filter located between the label and the lens and directed towards the left side of the label and a second bandpass filter located between the label and the lens and directed towards the right side of the label.

9. The optical barcode reader of claim 8 wherein each of said side planes is angled at a plane angle of 10 to 15 degrees.

10. The optical barcode reader of claim 8 further comprising a means for preventing light from entering a central area of the light input side of the lens.

11. The optical barcode reader of claim 8 wherein the lens is formed from an optically transparent plastic.

12. The optical barcode reader of claim 8 wherein the cross sectional area of the input side is more than twice that of the output side.

13. The optical barcode reader of claim 8 wherein the photodetecting means comprises dual photodiodes.

14. An optical signal conditioner for receiving light reflected from barcode labels and directing it to a photodetection means comprising:
   a lens having a pyramidal frusta-like body tapering at a rate of 15–25 degrees from a base end that serves as an optical input for incoming signal light reflected from a label, and having its truncated end as an output for directing concentrated light onto a photodetection means, said base end at said input formed with a pair of oppositely angled side planes that merge at the center of the base with a rectangular protuberance that separates said side planes, said lens being oriented so that said side planes of said lens are facing opposite ends of a scanned label.

15. The optical signal conditioner of claim 14 further comprising a means for preventing light from entering a central area of the light input side of the lens.

16. The optical signal conditioner of claim 14 wherein the lens is formed from optically transparent plastic.

17. The optical signal conditioner of claim 14 further comprising a plurality of bandpass filters, one of which is located adjacent and parallel to each side plane.

18. The optical signal conditioner of claim 14 wherein said side planes are angled at a plane angle of approximately 10 to 15 degrees.

19. The optical signal conditioner of claim 20 wherein the bandpass filters and side planes are angled such that the sum of each filter angle rating plus the plane angle equals the scan angle.

20. The optical signal conditioner of claim 14 wherein the cross-sectional area of the input side is more than twice that of the output side.

* * * * *

UNITED STATES PATENT AND TRADEMARK OFFICE
CERTIFICATE OF CORRECTION

PATENT NO. : 5,239,169
DATED : August 24, 1993
INVENTOR(S) : James E. Thomas

It is certified that error appears in the above-identified patent and that said Letters Patent is hereby corrected as shown below:

Claim 19, column 6, at line 54, delete "claim 20" and replace with --claim 17--.

Signed and Sealed this

Twenty-fourth Day of May, 1994

Attest:

BRUCE LEHMAN

Attesting Officer

Commissioner of Patents and Trademarks